United States Patent
Pilney et al.

(10) Patent No.: US 10,602,657 B2
(45) Date of Patent: Mar. 31, 2020

(54) PROTECTED TREAD WIDENING FOR SELF-PROPELLED SPRAYER

(71) Applicant: CNH Industrial America LLC, New Holland, PA (US)

(72) Inventors: Brian Pilney, West Bend, WI (US); Blaine A. Schwalbe, Valders, WI (US)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 15/815,149

(22) Filed: Nov. 16, 2017

(65) Prior Publication Data

US 2019/0141884 A1    May 16, 2019

(51) Int. Cl.

| | |
|---|---|
| *B62D 49/06* | (2006.01) |
| *A01C 23/00* | (2006.01) |
| *A01B 63/16* | (2006.01) |
| *B62D 21/18* | (2006.01) |
| *A01M 7/00* | (2006.01) |
| *A01B 63/00* | (2006.01) |
| *B60B 35/10* | (2006.01) |
| *B60B 35/16* | (2006.01) |

(52) U.S. Cl.
CPC .......... *A01C 23/008* (2013.01); *A01B 63/16* (2013.01); *A01M 7/0082* (2013.01); *B62D 21/186* (2013.01); *B62D 49/0678* (2013.01); *A01B 63/006* (2013.01); *B60B 35/109* (2013.01); *B60B 35/163* (2013.01)

(58) Field of Classification Search
CPC ..... A01B 63/006; A01B 63/16; B60B 35/109; B62D 49/0678
See application file for complete search history.

(56) References Cited

U.S. PATENT DOCUMENTS

| | | | |
|---|---|---|---|
| 3,964,565 A | 6/1976 | Cagle et al. | |
| 4,350,222 A | 9/1982 | Lutteke et al. | |
| 4,619,340 A | 10/1986 | Elmer et al. | |
| 5,039,129 A * | 8/1991 | Balmer | B60G 3/04 180/209 |
| 5,083,630 A | 1/1992 | Zaun | |

(Continued)

FOREIGN PATENT DOCUMENTS

WO    2015040337    3/2015

*Primary Examiner* — Karen Beck
(74) *Attorney, Agent, or Firm* — Rebecca L. Henkel; Rickard K. DeMille

(57) ABSTRACT

A protected tread widening system for a self-propelled high clearance sprayer. The system includes a frame with side rails and a first cross member and a second cross member extending between the opposite side rails, with the cross members being substantially hollow. Each of the cross members form slider receivers. The system also includes axle slider assemblies that are telescopically inserted into the slider receivers. Additionally, actuators are mounted within the cross members. These actuators are secured to the frame and to the axle slider assemblies to allow for telescopic movement of the axle slider assemblies into and out of the cross members. The actuators run substantially through a central axis of the first cross member and a central axis of the second cross member. This minimizes the bending moment of each actuator. Additionally, this system isolates the actuators from materials outside of the cross members.

20 Claims, 8 Drawing Sheets

(56) References Cited

U.S. PATENT DOCUMENTS

| | | | | |
|---|---|---|---|---|
| 6,145,610 | A * | 11/2000 | Gallignani | B62D 55/084 180/9.48 |
| 6,199,769 | B1 * | 3/2001 | Weddle | B60G 17/0416 180/906 |
| 6,206,126 | B1 * | 3/2001 | Thiermann | B62D 21/14 180/209 |
| 6,386,554 | B1 | 5/2002 | Weddle | |
| 6,454,294 | B1 | 9/2002 | Bittner et al. | |
| 7,044,251 | B2 | 5/2006 | Mast | |
| 7,163,227 | B1 * | 1/2007 | Burns | B60B 35/1054 180/906 |
| 8,376,078 | B2 * | 2/2013 | Hiddema | A01C 23/008 180/209 |
| 8,910,732 | B1 * | 12/2014 | Risen | B66C 23/62 180/9.48 |
| 9,241,450 | B2 | 1/2016 | Mangen | |
| 9,724,966 | B2 * | 8/2017 | Daffue | A01B 51/00 |
| 10,226,965 | B1 * | 3/2019 | Schwalbe | B60B 35/109 |
| 2011/0148053 | A1 * | 6/2011 | Motebennur | B60G 9/00 280/6.16 |
| 2014/0041962 | A1 | 2/2014 | Borghi | |
| 2015/0034736 | A1 | 2/2015 | Jones et al. | |
| 2015/0102586 | A1 | 4/2015 | Tollefsrud et al. | |
| 2016/0096550 | A1 * | 4/2016 | Dames | B62D 7/142 180/252 |
| 2017/0334493 | A1 * | 11/2017 | Nooren | B62D 21/14 |
| 2019/0059351 | A1 * | 2/2019 | Brooks | A01M 7/0089 |
| 2019/0070918 | A1 * | 3/2019 | Lang | B60F 1/043 |
| 2019/0191614 | A1 * | 6/2019 | Hafvenstein | A01B 63/006 |

* cited by examiner

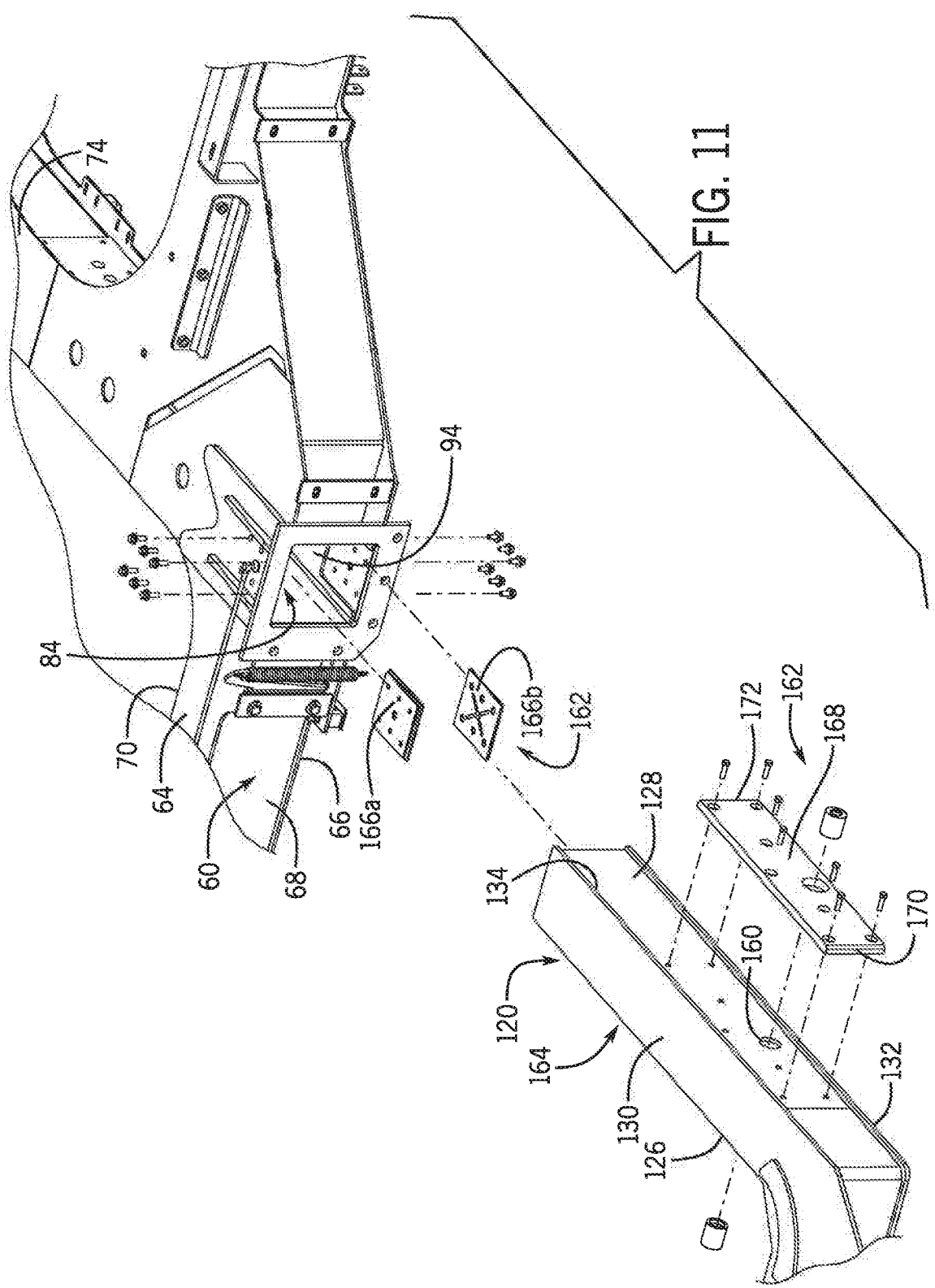

PROTECTED TREAD WIDENING FOR SELF-PROPELLED SPRAYER

FIELD OF THE INVENTION

The invention relates generally to agricultural product application equipment or agricultural machines such as self-propelled sprayers and, in particular, to slider legs that telescopically slide into and out of cross-members of a frame, where the actuators and cylinders that adjust the width of the slider legs are routed inside the frame to protect the actuators, and preferably run substantially parallel through a central axis of the cross members of the frame.

BACKGROUND OF THE INVENTION

Many high-clearance sprayers have tread width connections that include axle sliders for movably mounting swingarms and axle-supporting legs to chassis frames. The movable mounting of the tread widths connectors provide leg widening capabilities of the sprayer for adjusting track width. Oftentimes, a secondary structure called a slider is fastened to suspension components including the wheel and to the main chassis. These include a right slider assembly and a left slider assembly. Typically, hydraulic cylinders are used to lengthen or decrease the location of these sliders. For instance, one pair of cylinders are attached to the right slider and main chassis and another pair of cylinders are attached to the left slider and main chassis. These hydraulic cylinders are usually placed in front of or behind the cross tubes of the main chassis and the slider.

This can be problematic for a number of reasons. For instance, when the hydraulic cylinders are located outside of the cross tubes, the bending moment and stress that is caused due to the flex from having the cylinders mounted away from the axis of the cross tube can result in unneeded wear and tear on the cylinders, or even premature failure of these cylinders. To address these concerns, the cylinders need to be strengthened, which result in bulkier, heavier, and more expensive cylinders due to the additional materials. Additionally, when located outside of the cross tubes, these cylinders can be exposed to the various chemicals and pesticides that are sprayed form these sprayers, which similarly can cause unneeded wear and tear on the cylinders.

SUMMARY OF THE INVENTION

A high clearance sprayer with an adjustable track width with a frame, a first axle slider assembly, a second axle slider assembly, and a plurality of actuators. The frame can include a first side, a second side, a first cross member that is substantially hollow extending from the first side to the second side to form a first slider receiver on the first side and a second slide receiver on the second side. Additionally, the frame can include a second cross member that is substantially hollow extending from the first side to the second side to form a third slider receiver on the first side and a fourth slider receiver on the second side.

According to an aspect of the present invention, the first axle slider assembly may be configured to be telescopically inserted into the first slider receiver and the third slider receiver. Similarly, the second axel slider assembly is configured to be telescopically inserted into the second slider receiver and the fourth slider receiver.

According to another aspect of the invention, the plurality of actuators is secured to the frame and to the first axle slider assembly and the second axle slider assembly. These actuators may telescopically move the first axle slider assembly and the second axle slider assembly into and out of the first cross member and the second cross member to adjust the width of the track. The plurality of actuators may include a first cylindrical actuator, a second cylindrical actuator, a third cylindrical actuator, and a fourth cylindrical actuator. For instance, the first cylindrical actuator may be attached to the first axle slider assembly and to the first cross member. Additionally, the second cylindrical actuator may be attached to the second axle slider assembly and to the first cross member. As such, the first actuator and the second actuator may run substantially parallel through a central axis extending through the first cross member. Stated differently, the first actuator and the second actuator may run substantially midway between a top wall and a bottom wall of the first cross member and the substantially midway between a front wall and a rear wall of the first cross member. Further still, the third cylindrical actuator may be attached to the first axle slider assembly and to the second cross member. Also, the fourth cylindrical actuator may be attached to the second axle slider assembly and to the second cross member. As such, the third actuator and the fourth actuator may run substantially parallel through a central axis extending through the second cross member. Stated differently, the third actuator and the fourth actuator run substantially midway between a top wall and a bottom wall of the second cross member and substantially midway between a front wall and a rear wall of the second cross member.

According to yet another aspect of the invention, a bending moment of each actuator relative to the first cross member and the second cross member can be minimized in comparison to similar systems found in the prior art. Additionally, as a result the plurality of actuators is substantially isolated from outside of the first cross member and the second cross member. Further still, a plurality of mounting plates may be mounted to the first cross member and the second cross member to substantially isolate the actuators from the outside of the first and second cross members. Additionally, the plurality of actuators may be mounted to an interior of the first axle slider leg, the second axle slider leg, the third axle slider leg, and the fourth axle slider leg. These actuators may extend or retract the same distance when actuated. Furthermore, the plurality of actuators may be located substantially concentrically inside of each of the slider receivers for telescopically moving the respective slider leg within the slider receiver for adjusting tread width. Additionally, each frame cross member may house a left actuator for actuating the left axle slider and a right actuator for actuating the right axle slider. For instance, the left actuator may comprise the first cylindrical actuator and the third cylindrical actuator and the right actuator may comprise the second cylindrical actuator and the fourth cylindrical actuator.

According to another aspect of the invention, the first axle slider assembly may include a first axle slider leg configured to be telescopically inserted into the first slider receiver, a second axle slider leg configured to be telescopically inserted into the third slider receiver, and a main slider body that extends parallel to the first side of the frame from the first axle slider leg to the second axle slider leg. Additionally, the first axle slider assembly may include a pair of swingarms that extend from a front and rear segment of the main slider body, as well as a pair of wheels that may be rotatably supported by the pair of swingarms.

According to another aspect of the present invention, the second axle slider assembly may include a third axle slider leg configured to be telescopically inserted into the second slider receiver, a fourth axle slider leg configured to be telescopically inserted into the fourth slider receiver, and a main slider body that extends parallel to the second side of the frame from the third axle slider leg to the fourth axle slider leg. The second axle slider assembly may also include a pair of swingarms that extend from a front and rear segment of the main slider body, as well as a pair of wheels that may be rotatably supported by the pair of swingarms.

According to yet another aspect of the present invention, the high clearance sprayer with adjustable tread width may include a chassis having a frame, a pair of slider receivers, a left axle slider and a right axle slider, actuators, and a tread width connection assembly. For instance, the frame may have left and right rails at left and right sides of the frame and a pair of frame cross members that extend between the left and right frame side rails. The frame cross members may each have a central axis extending along the length of the cross members. The left axle slider and the right axle slider may be at the left and right sides of the frame, with each axle slider carrying a pair of wheels of the high clearance sprayer. Each of the left and right axle sliders may include a pair of slider legs that is telescopically housed in the passages of the respective slider receivers.

According to another aspect of the invention, a pair of left slider receivers may be defined by left segments of the cross members. Each of the left slider receivers may have an outer end with an opening that connects to a slider passage that extends longitudinally through the respective slider receiver. Also, a pair of right slider receivers may be defined by right segments of the cross members. Each of the right slider receivers may have an outer end with an opening that connects to a slider passage that extends longitudinally through the respective slider receiver.

According to another aspect of the present invention, the left axle slider is configured to support a pair of left wheels. The left axle receiver also includes a main slider body that extends parallel to the left frame rail, as well as a pair of slider legs that extend from first and second ends of the main slider body toward the frame. These slider legs may be telescopically housed in the pair of left slider receivers. Similarly, the right axle slider is configured to support a pair of right wheels. The right axle receiver also includes a main slider body that extends parallel to the right frame rail, as well as a pair of slider legs that extend from first and second ends of the main slider body toward the frame. These slider legs may be telescopically housed in the pair of right slider receivers.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 11 is an exploded isometric view of the first axle slider and the frame.

DETAILED DESCRIPTION OF THE PREFERRED EMBODIMENTS

Figure 1:
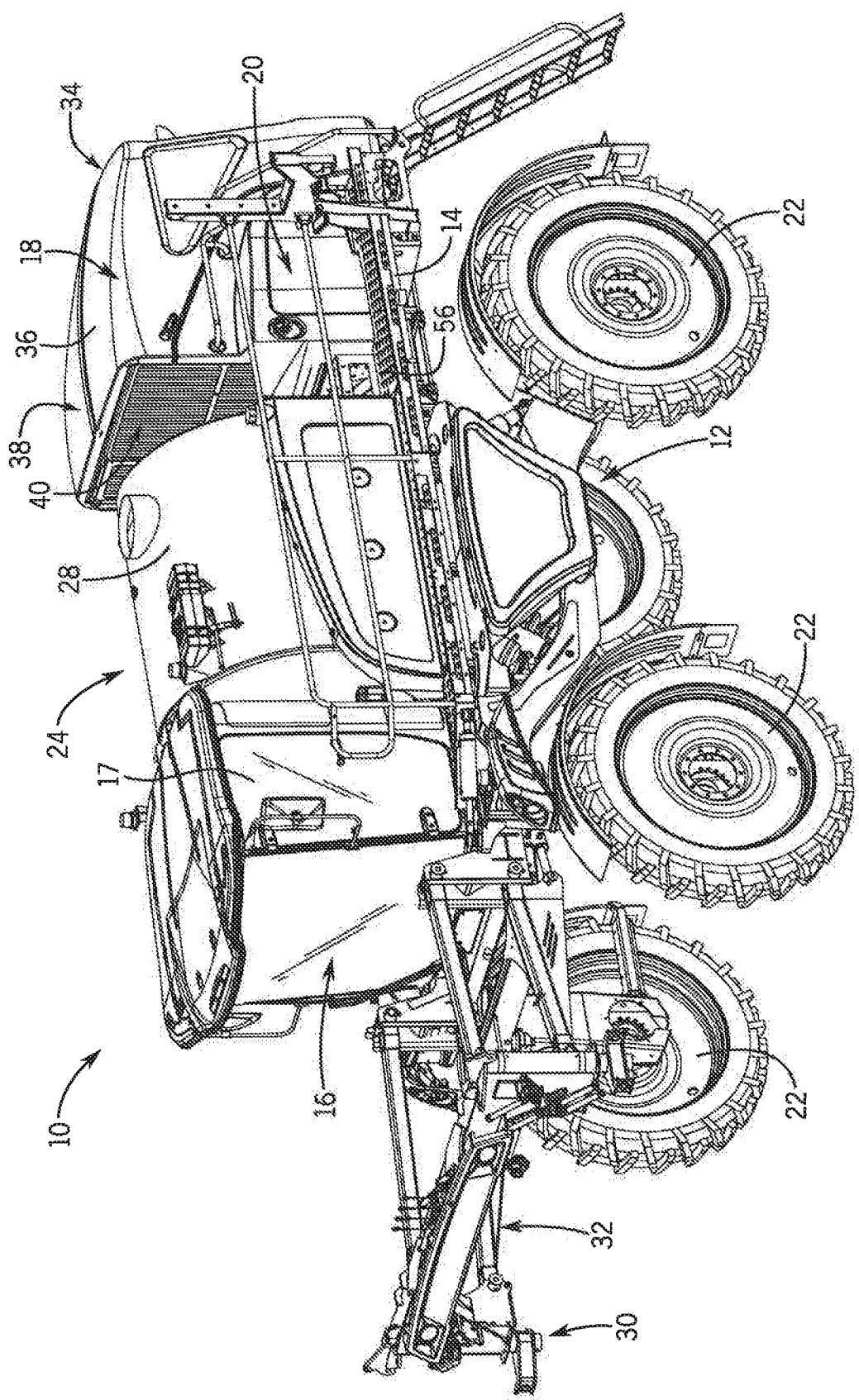
FIG. 1 is an isometric view of an agricultural machine.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as a rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
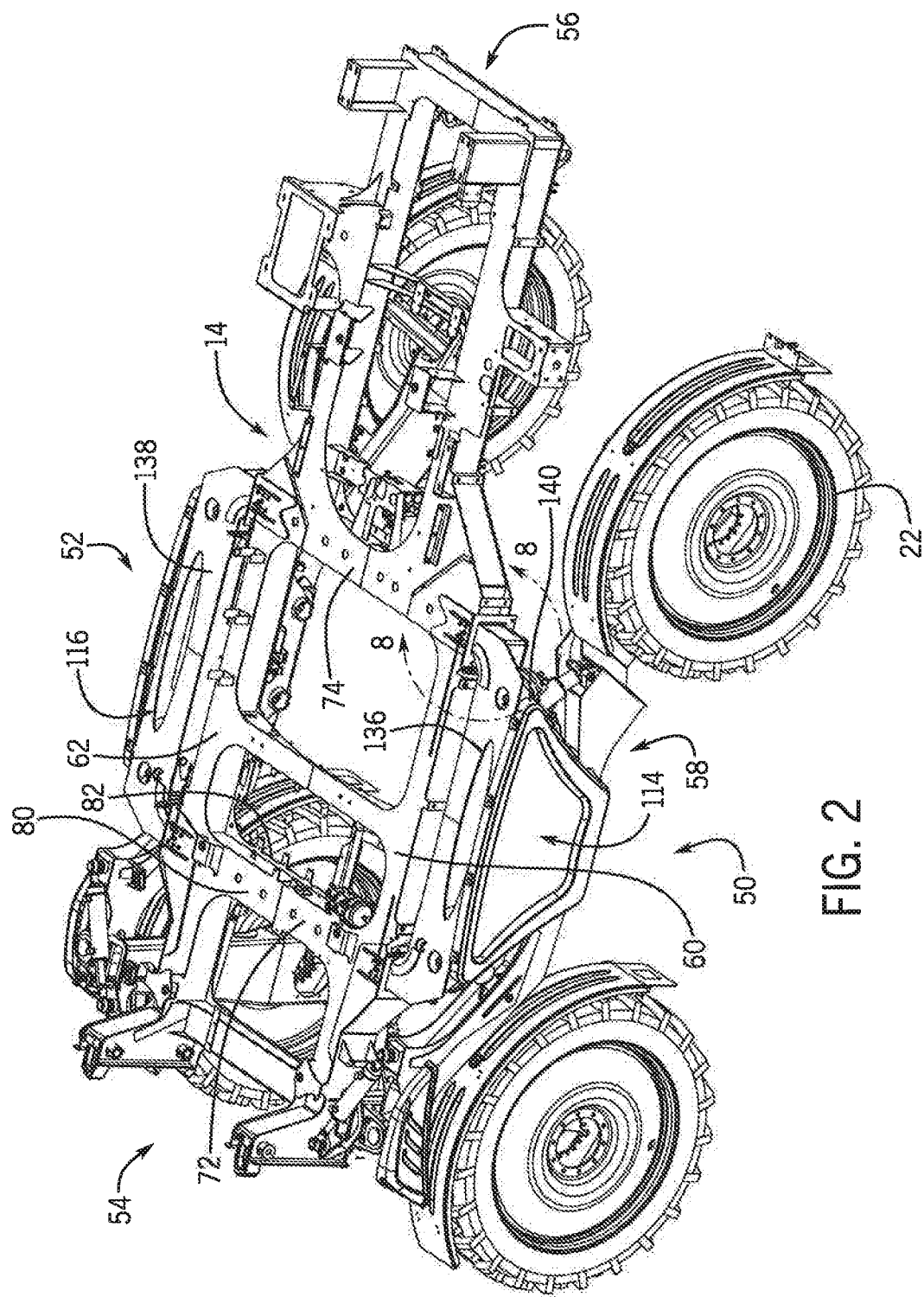
FIG. 2 is an isometric view of a chassis frame of the agricultural machine of FIG. 1.

The chassis frame 14 and various other components associated with the chassis frame 14 that facilitate tread width adjustments or that allow for shipping of various components associated with the sprayer 10 will be described in greater detail. The chassis frame 14, as most clearly shown in FIG. 2-4 includes a first side 50, a second side 52, a front end 54, a back end 56, and a central portion 58. The first side 50 includes a first frame side-rail 60 within the central portion 58 and the second side 52 includes a second frame side-rail 62 within the central portion 58. Each the frame side-rails 60, 62 are generally tubular in shape with a top wall 64, a bottom wall 66, a first side wall 68, and a second side wall 70.

Additionally, the chassis frame 14 includes a first cross member 72 that extends from the first side-rail 60 to the second side-rail 62 at the front of the central portion 58 and a second cross member 74 that extends from the first side-rail 60 to the second side-rail 62 at the rear of the central portion 58. Each of the cross members 72, 74 have a generally tubular body defined by interconnected slider receiver walls with inwardly-facing surfaces, for instance, front and rear walls 76, 78 respectively, and top and bottom walls 80, 82 respectively. As such, the cross members 72, 74 are substantially hollow, which allows various components to be routed within each cross member 72, 74 and for components to slide into and out of each cross member 72, 74.

The cross members 72, 74 may also have openings 84 located at outer ends of either frame side-rail 60, 62 that form slider receivers 86, 88, 90, 92. While only one opening 84 is shown in FIG. 11, it should be understood that similar openings are formed in each of the outer ends of the frame side-rails 60, 62 adjacent to the cross members 72, 74. As shown, a first slider receiver 86 may be located at the first frame side-rail 60 and a second slider receiver 88 may be located at the second frame side-rail 62 of the first cross member 72. A third frame slider receiver 90 may similarly be located at the first frame side-rail 60 and a fourth frame slider receiver 92 may be located at the second frame side-rail 62 of the second cross member 74. As such, the first slider receiver 86 and the third slider receiver 90 may constitute a pair of left slider receivers and the second slider receiver 88 and the fourth slider receiver 92 may constitute a pair of right slider receivers. The cross members 72, 74 may also form slider passages 94 directly adjacent to the slide receivers 86, 88, 90, 92 in both the first cross member 72 and the second cross member 74. These frame slider receivers 86, 88, 90, 92 and slider passages 94 are configured to accommodate slider legs, which will be further described below.

Figure 7:
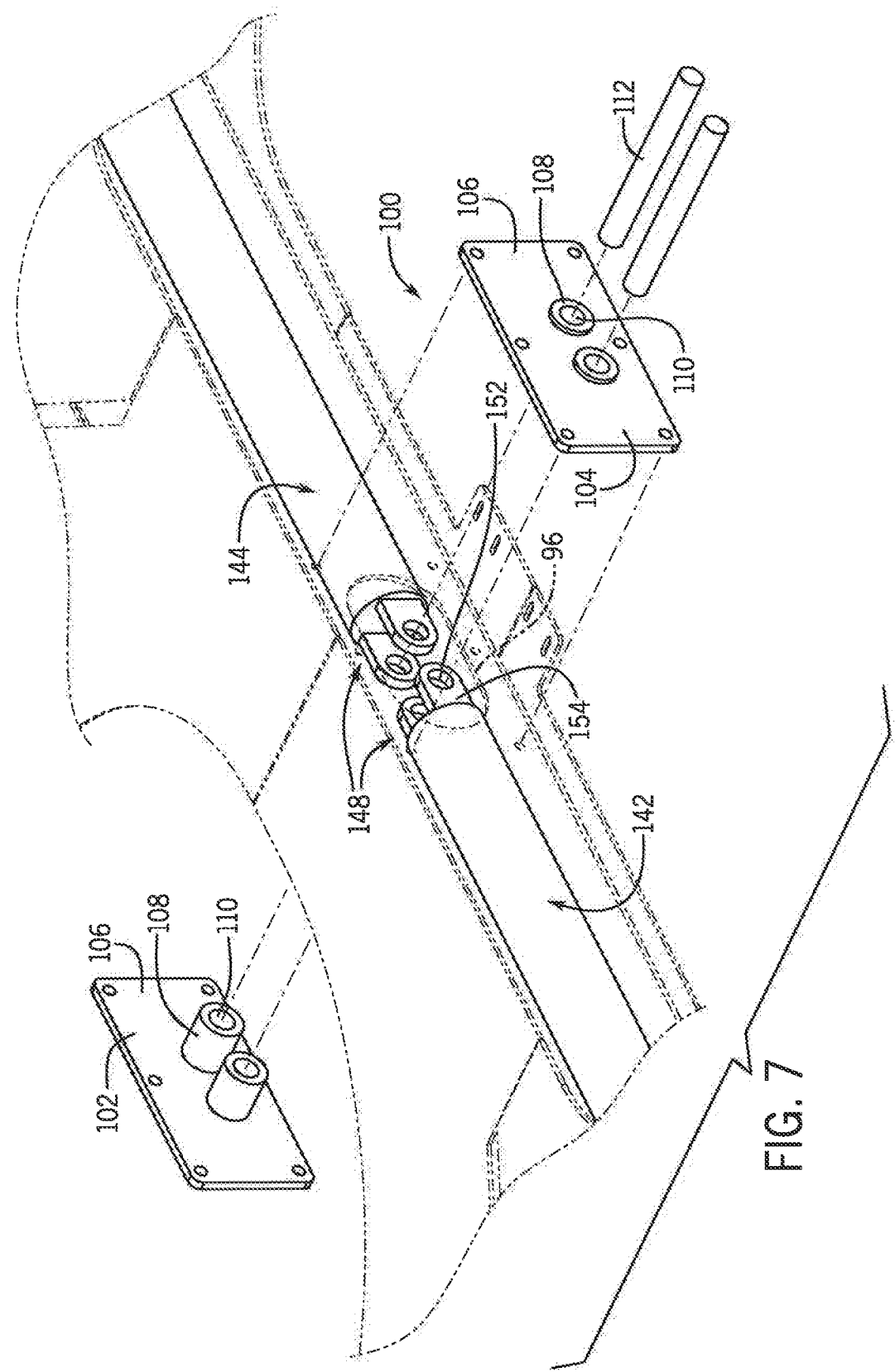
FIG. 7 is an exploded isometric view of the cross member and two mounting plates used to secure a pair of actuators to the chassis frame.
Figure 8:
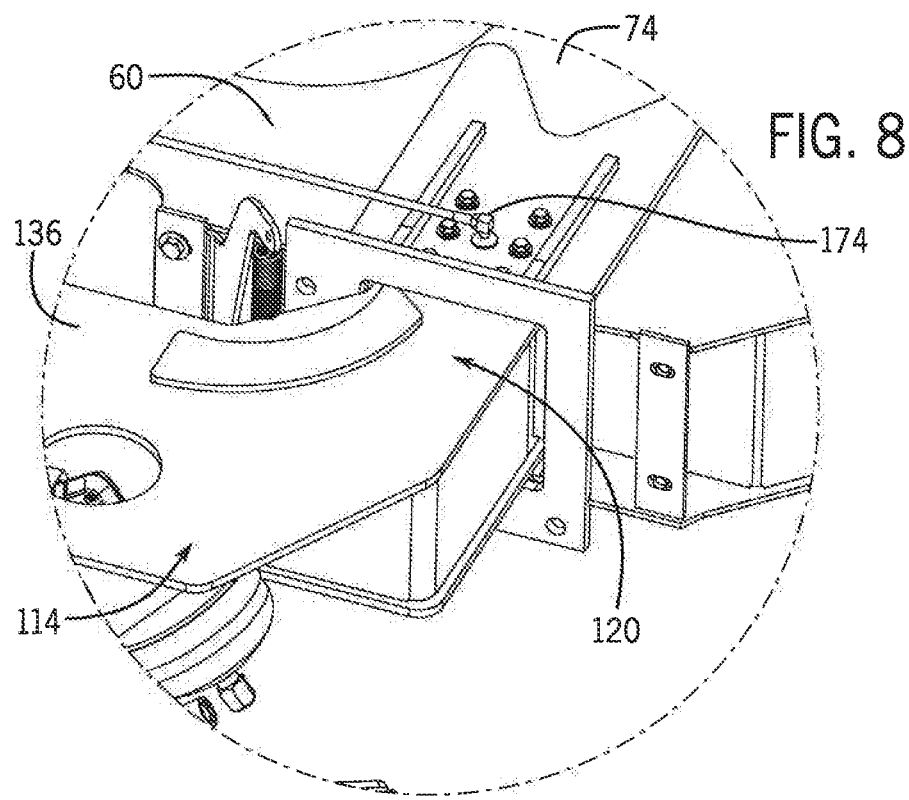
FIG. 8 is detailed isometric view of an axle slider and a portion of the chassis frame in the first position of FIGS. 3 and 5, taken generally along line 8-8 of FIG. 2.

Further, the cross members 72, 74 may feature openings 96 formed in the front and rear walls 76, 78 to facilitate access to the interior of the cross members 72, 74. While only a first opening 96 is shown in FIG. 7, a second opening, a third opening, and a fourth opening are similarly formed in the cross members 72, 74 as described below. For instance, the first opening 96 may be formed in the front wall 76 of the first cross member 72 and the second opening may be formed in a rear wall 78 of the first cross member 72. Similarly, the third opening may be formed in the front wall 76 of the second cross member 74 and the fourth opening may be formed in the rear wall 78 of the second cross member 74. These openings 96 enable maintenance procedures on parts that may be routed through the cross members 72, 74. Preferably, these openings 96 are formed along the longitudinal axis of the sprayer 10. This is especially helpful because many of the components routed through the cross members 72, 74 are mounted to the center of the agricultural machine 10.

When the sprayer 10 is in use, however, a tread width connection assembly 100 may be used to close up the openings 96 to protect the contents housed within the cross member 72, 74. For instance, the tread width connection assembly 100 may include four mounting plates that correspond with the four openings 96 formed in the front and the rear walls 76, 78 of the cross member 72, 74. Still looking to FIG. 7, while the mounting plates 102, 104 are only shown with the second cross member 74, identical mounting plates are similarly mounted to the first cross member 72. More specifically, a first mounting plate may be mounted to the front wall 76 of the first cross member 72 to cover the first opening and a second mounting plate may be mounted to the rear wall 78 of the first cross member 72 to cover the second opening. Similarly, a third mounting plate 102 may be mounted to the front wall 76 of the second cross member 74 to cover the third opening and a fourth mounting plate 104 may be mounted to the rear wall 78 of the second cross member 74 to cover the fourth opening 96.

Each of the mounting plates 102, 104 include a generally flat body 106 with at least one collar 108 extending outwardly therefrom with an opening 110 formed therein. As shown in FIG. 7, each of the mounting plates 102, 104 have two circular collars 108, where each of the two circular collars 108 coincide with one of two actuators described below that are routed through the cross members 72, 74. Each collar 108 is configured to be inserted into the openings 96 formed in the cross members 72, 74. In this way, the collars 108 help to locate the mounting plates 102, 104 relative to the opening 96 formed in the cross members 72, 74 to ensure a secure fit. The mounting plates 102, 104 are secured to the chassis frame 14 using bolts, screws, or other fasteners that are inserted through the mounting plates 102, 104 and into the front wall 76 and rear wall 78. Additionally, at least one pin 112 and as shown two pins may be inserted through the openings 110 in the mounting plates 102, 104 as well as the respective cross member 72, 74. The pins 112 may also be configured to extend through components located within the respective cross member, as will further be described below. Additionally, these collars 108 provide added surface area to improve the structural connection between the mounting plates 102, 104, the cross members 72, 74, and the components located within the cross members 72, 74.

The mounting plates 102, 104 therefore define a mounted position and an unmounted position. In the mounted position, the mounting plates 102, 104 are connected to the respective frame cross member 72, 74. This allows the openings 96 to be covered to prevent access to components mounted within the cross members, such as actuators that will further be described below, as well as any other components that may be mounted within the cross members 72, 74. In the unmounted position, the mounting plates 102, 104 are removed from the respective frame cross member 72, 74. This allows the interior of the frame cross members 72, 74 to be uncovered, which allows for access to the components routed within the cross members 72, 74. Such access allows for maintenance of components within the cross members 72, 74.

Next, axle slider assemblies 114, 116 will be further described, which extend outwardly and beyond the first side 50 and the second side 52 of the chassis frame 14, and are movable relative to the chassis frame 14 and support the sprayer 10 wheels 22. The sprayer 10 includes two axle slider assemblies, with a first axle slider 114 being movably adjusted relative to the first side 50 and a second axle slider 116 being movably adjusted relative to the second side 52. Preferably, the axle sliders 114, 116 will both move the same distance once actuated, such that the chassis frame 14 is always centered relative to the two axle sliders 114, 116.

Each of the axle sliders 114, 116 include axle slider legs, a main slider body, and a pair of swing arms. More specifically, the first axle slider 114 includes a first axle slider leg 118 that may be telescopically inserted into the first slider receiver 86. The first axle slider 114 also includes a second axle slider leg 120 that may be telescopically inserted into the third slider receiver 90. Similarly, the second axle slider 116 includes a third axle slider leg 122 that may be telescopically inserted into the second slider receiver 88. The second axle slider 116 also includes a fourth axle slider leg 124 that may be telescopically inserted into the fourth slider receiver 92. Each of the slider legs 118, 120, 122, 124 have interconnected slider leg walls having outwardly-facing surfaces, including front and rear walls 126, 128 respectively, and top and bottom walls 130, 132 respectively. While these walls are only shown in FIG. 11 with respect to the second axle slider leg 120, it should be noted that the remaining legs 118, 122, 124 have similar walls. Additionally, the front and/or rear wall 126, 128 may be slightly offset from outer edges of the top and bottom walls 130, 132, as best seen in FIG. 11. In this way, a lip 134 may be formed where the edges of the top and bottom walls 130, 132 extend beyond the front and/or rear wall 126, 128.

Additionally, the first axle slider 114 includes a main slider body 136 that extends parallel to the first side 50 of the chassis frame 14 from the first axle slider leg 118 to the second axle slider leg 120. Correspondingly, the second axle slider 116 includes a main slider body 138 that extends parallel to the second side 52 of the chassis frame 14 from the third axle slider leg 122 to the second axle slider leg 124. In this way, the second axle slider 116 is the inverse of the first axle slider 114. Further still, pairs of swingarms 140 extend from a front and rear segment of both main slider bodies 136, 138. Finally, a pair of wheels 22 are rotatably supported by each of the pair of swing arms 140.

Figure 5:
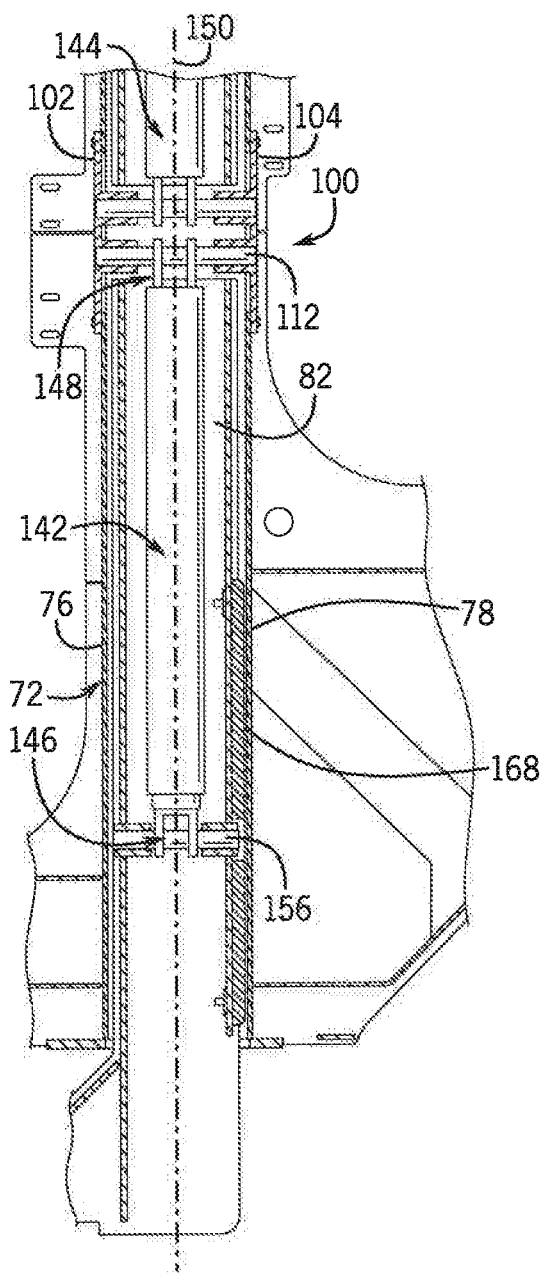
FIG. 5 is a cross sectional side elevation view of the frame in the first position, taken generally along line 5-5 of FIG. 3 showing the interior of a cross member.
Figure 6:
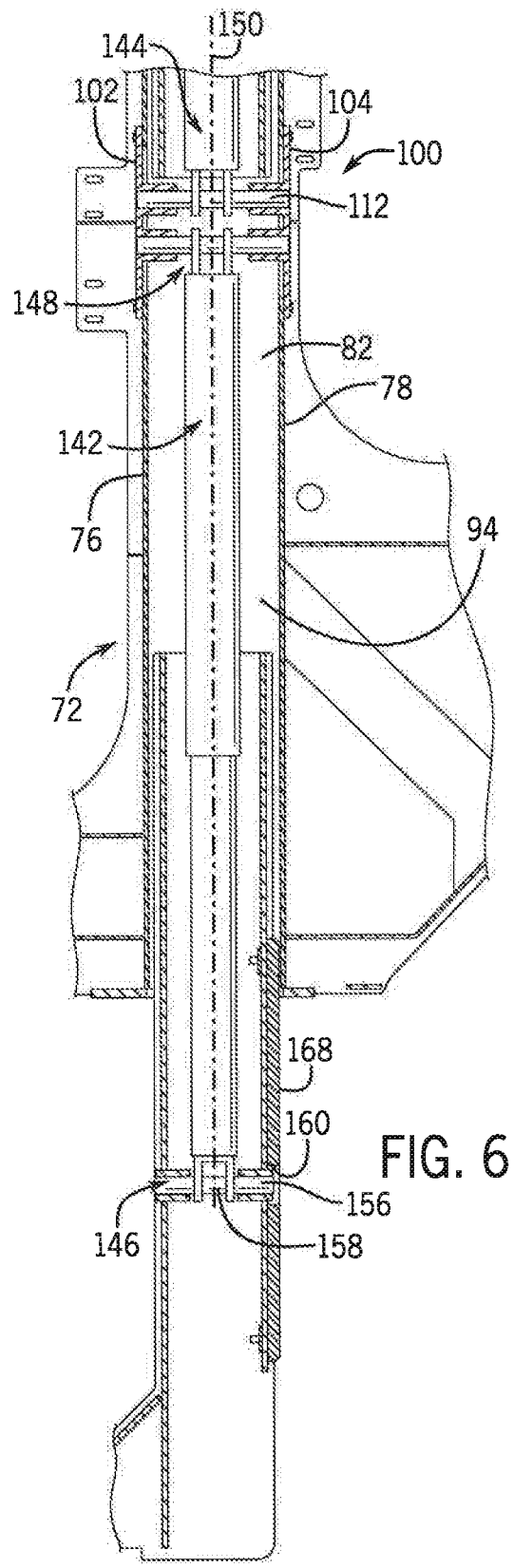
FIG. 6 is a cross sectional side elevation view of the frame in the second position, taken generally along line 6-6 of FIG. 4 showing the interior of the cross member.

To facilitate movement of the first axle slider 114 and the second axle slider 116, a plurality of actuators may be mounted within the first cross member 72 and the second cross member 74. While FIGS. 5-7 show a pair of actuators 142, 144 contained within the second cross member 72, it should be noted that an identical pair of actuators are also located within the first cross member 72 as will be described below. As shown, the plurality of actuators 142, 144 are substantially cylindrical actuators, where each cylindrical actuator 142, 144 includes a first end 146 and second end 148. Four actuators may be utilized that attach to the chassis frame 14 and one of the axle slider legs 118, 120, 122, 124. A first actuator may be mounted within the first cross member 72 at one end and to the first slider leg 118 at the other end and a third actuator 142 may be mounted within the second cross member 74 at the first end end 146 and to the second slider leg 120 at the second end 148. As such, the first actuator and third actuator 142 may form a first side actuator pair for moving the first axle slider assembly 114 into or out of the chassis frame 14. Additionally, a second actuator may be mounted within the first cross member 72 at one end and to the third slider leg 122 at the other end and a fourth actuator 144 may be mounted within the second cross member 74 at one end 146 and to the fourth slider leg 124 at the other end 148. As such, the second actuator and fourth actuator 144 may form a second side actuator pair for moving the second axle slider assembly 116 into or out of the chassis frame 14.

It should also be noted that the actuators 142, 144 are preferably mounted such that each actuator 142, 144 is located substantially close to the center axis 150 of the cross member 72, 74, midway between the front wall 76 and the rear wall 78, and midway between the top wall 80 and the bottom wall 82. For instance, the first and second actuators may both run substantially parallel through a central axis extending through the first cross member 72. Stated differently, the first and second actuators may be substantially concentrically mounted within the first cross member 72. Similarly, the third and fourth actuators 142, 144 may also both run substantially parallel through a central axis 150 extending through the second cross member 74, as shown in FIGS. 5 and 6. The third and fourth actuators 142, 144 also may be substantially concentrically mounted within the second cross member 74. This is advantageous over similar systems found in the prior art where actuators were used but were not concentrically mounted within the respective cross member. More specifically, the concentric location of the actuators 142, 144 within the cross member 74 reduces the bending moment on the actuators 142, 144, as well as stress due to flex that is caused by having the actuators 142, 144 mounted away from the central axis of the cross member 74. Due to these reduced stresses and bending moments, the actuators 142, 144 can be smaller in size, which reduces the cost of the actuators 142, 144 as well as the amount of hydraulic fluid required for the actuators 142, 144 to function. Furthermore, the smaller sized actuators 142, 144 are easier to package and ship.

The plurality of actuators 142, 144 may be mounted on one end to the chassis frame 14 about the mounting plates 102, 104, as can best be seen in FIG. 7. More specifically, the pins 112 may be inserted through the first mounting plate 102, through openings 152 located in a yoke 154 of the actuator 142, 144 at the second end 148, and then through the second mounting plate 104. Therefore, the mounting plates 102, 104 and pins 112 mount the inner end of the actuator 142, 144 in place. Additionally, once the mounting plates 102, 104 are mounted to the chassis frame 14, the interior of the cross members 72, 74 may be isolated from the exterior of the cross member 72, 74. This helps to protect components within the cross members 72, 74, including the actuators 142, 144, from substances that are distributed from the sprayer 10, including chemicals, pesticides, and other liquids that could damage or reduce the efficiency of interior components, such as the actuators 142, 144. Additionally, when the mounting plates 102, 104 are removed in the unmounted position, the second end 148 of the actuators 142, 144 can be easily accessed for maintenance purposes.

Figure 3:
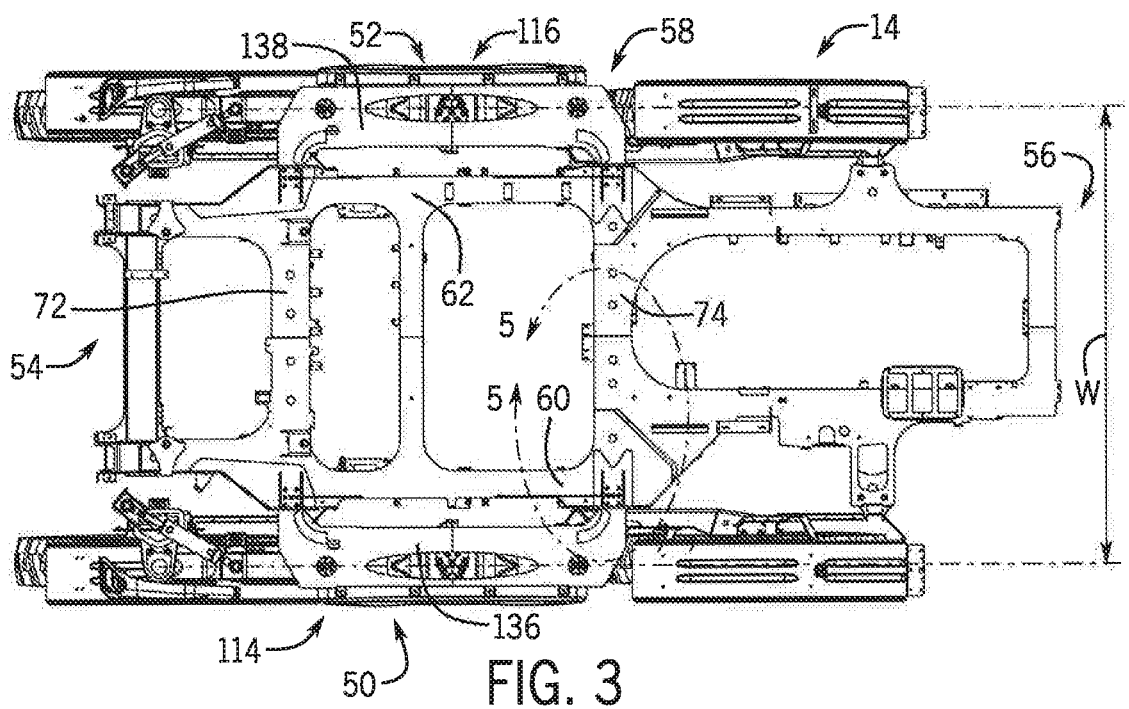
FIG. 3 is a top plan view of the frame of the agricultural machine of FIG. 1 in a first position with a first tread width wherein a first axle slider and a second axle slider are located directly adjacent to the chassis frame.
Figure 4:
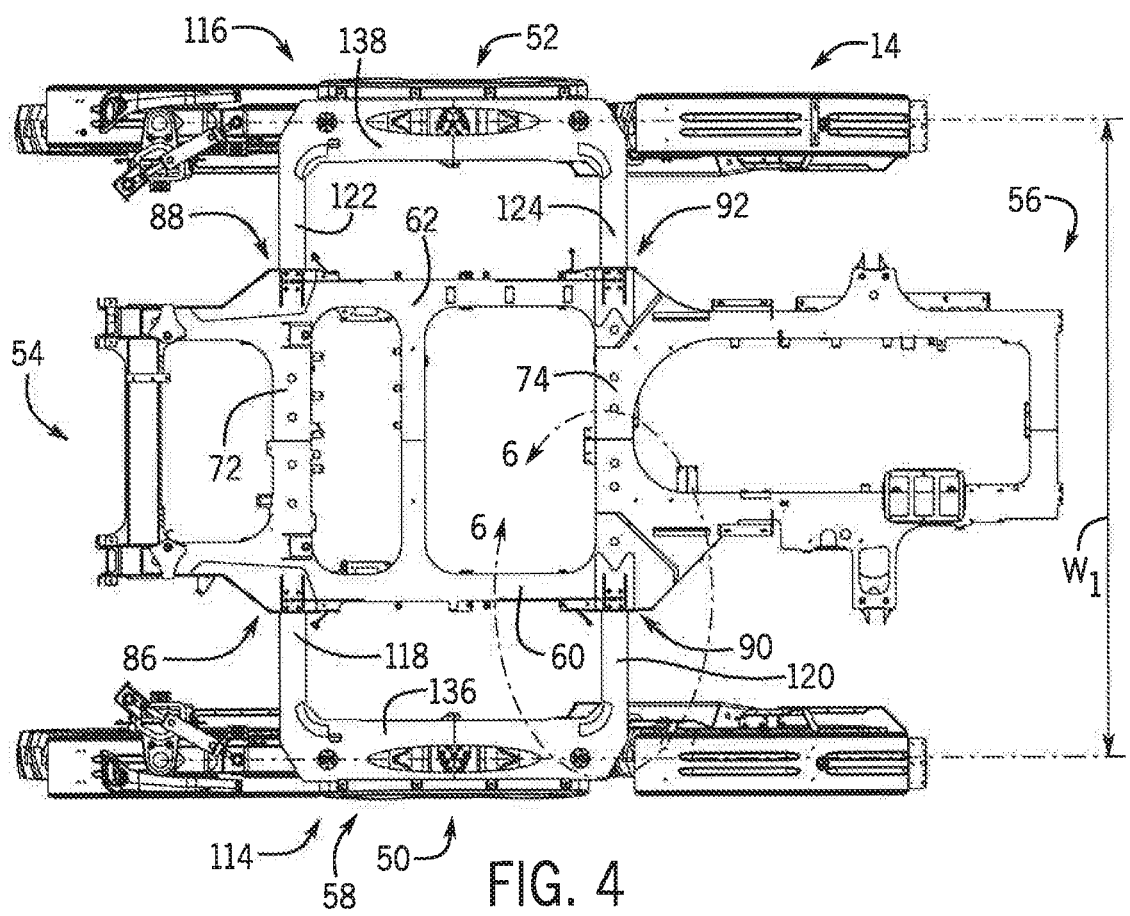
FIG. 4 is a top plan view of the frame of the agricultural machine of FIG. 1 in a second position with a second tread width wherein the first axle slider and the second axle slider are spaced apart from the chassis frame.
Figure 10:
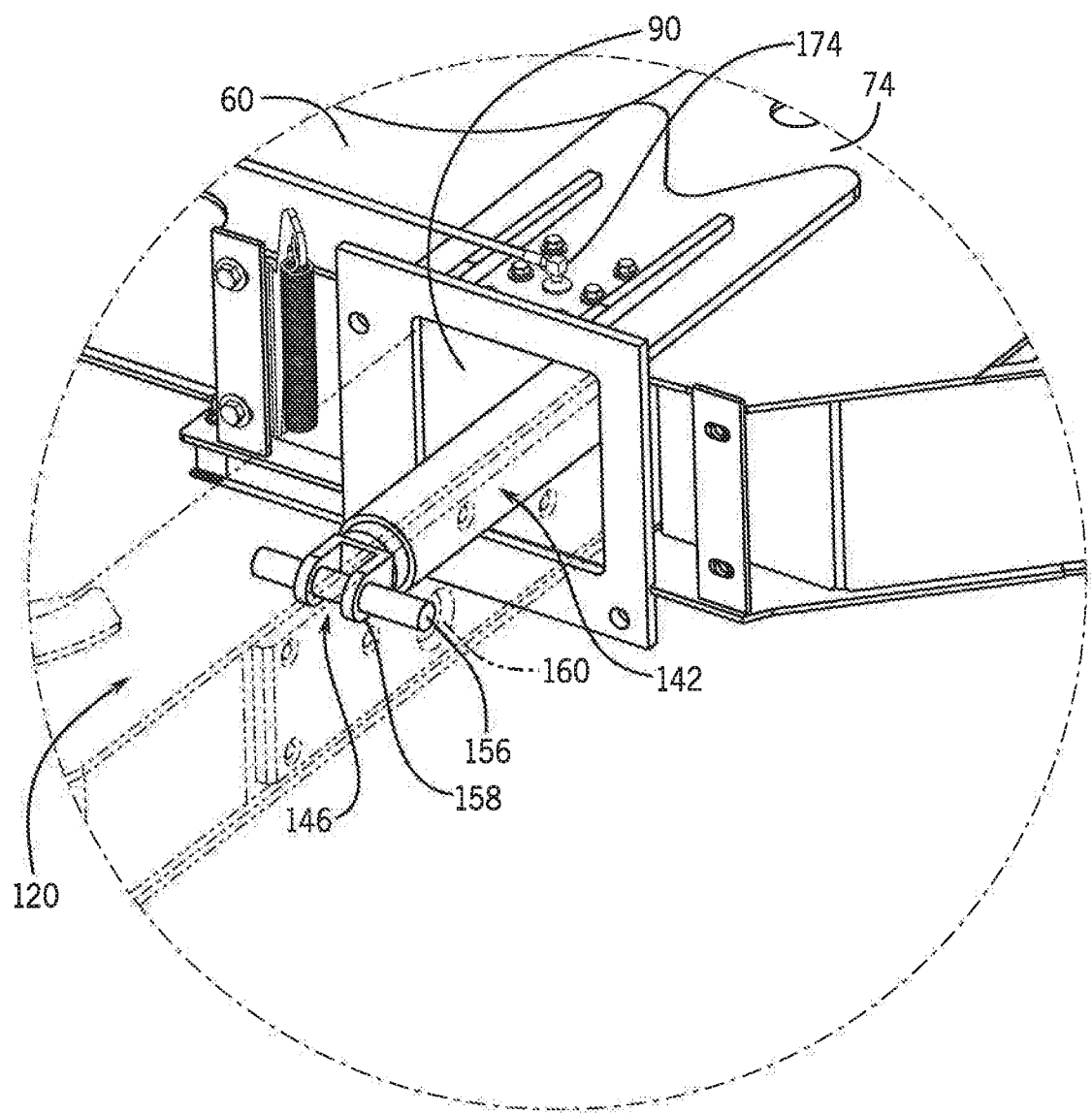
FIG. 10 is a detailed isometric view of the axle slider in phantom and a portion of the chassis frame showing the interior of the axle slider.

On the first end 146, the actuators 142, 144 are secured to the axle slider leg 118, 120, 122, 124, with one of the four actuators associated with one of the four axle slider legs. While FIG. 10 shows the connection between the third actuator 142 and the second axle slider leg 120, it should be noted that the other actuators could similarly be mounted to the other axle slider legs. Still looking to FIG. 10, the third actuator 142 may be secured within the second axle slider leg 120 with at least one pin 156 extending through an opening 158 formed in the first end 146 of the actuator 142 and an opening 160 formed in the second axle slider leg 120. As a result, when the actuators 142, 144 are actuated, the axle slider legs 118, 120, 122, 124 can be telescopically moved into or out of the respective cross member 72, 74. In turn, this results in telescopic movement of the first axle slider 114 and the second axle slider 116 into and out of the first cross member 72 and second cross member 74, which causes the overall width of the sprayer 10 to change. The overall width of the sprayer 10, and by extension the distance between the wheels 22 of the sprayer 10, can therefore be adjusted as desired. As seen in FIG. 3, the sprayer 10 is shown in a first minimum width W. The sprayer 10 can be expanded to a second maximum width W', as seen in FIG. 4. Of course, the sprayer 10 width could be adjusted to any width between width W and width W'. Further still, the sprayer 10 could be further extended beyond width W' in other embodiments. Again, preferably the actuators 142, 144 are synched such that they move an equal distance to ensure that the center of the sprayer 10 remains along the longitudinal axis.

Another aspect of the sprayer 10 relates to a slider to frame connection arrangement 162 that allows for movement between the pair of left slider receivers 86, 90 and the first axle slider 114 and the pair of right slider receivers 88, 92 and the second axle slider 116. This could be used for a sprayer 10 that is shipped with the chassis frame 14 separate from the axle sliders 114, 116, or where the sprayer 10 features a tread width adjustment feature. The frame connection arrangement 162 may include a reduced friction zone 164 that is defined at outer ends of the pair of left slider receivers 86, 90 and the pair of right slider receivers 88, 92. The reduced friction zone 164 helps facilitate the telescopic movement of the respective pairs of slider legs 118, 120, 122, 124 into and out of the pair of left slider receivers 86, 90 and the pair of right slider receivers 88, 92 described above while minimizing friction between the various components. For instance, a fixed slider wear pad 166 may be arranged in a fixed position within the reduced friction zone 164. Additionally, or in substitution to the fixed slider wear pad 166, a movable slider wear pad 168 may be movably arranged in the reduced friction zone 164. The movable slider wear pad 168 moves within the reduced friction zone 164 when the telescopic movement of the respective pairs of slider legs 118, 120, 122, 124 into and out of the pair of left slider receivers 86, 90 and the pair of right slider receivers 88, 92 described above.

The slider wear pads 166, 168 could be made of any material known to reduce friction between metallic components. For instance, the slider wear pads 166, 168 may be made of a material having an ultra-high molecular weight. Such materials may be made from recycled material. Each of the wear pads 166, 168 may be secured into place relative to the axle slider legs 118, 120, 122, 124 and/or slider receivers 86, 88, 90, 92 using bolts, screws, or other fasteners. Of course, multiple fixed slider wear pads 166 and multiple movable slider wear pads 168 could be used to further facilitate movement of the axle slider legs 118, 120, 122, 124 relative to the slider receivers 86, 88, 90, 92.

More specific configurations of slider wear pads 166, 168 will now be described. Although these slider wear pads 166, 168 will be described relative to the first axle slider assembly 114, it should be noted that similar configurations could be used with the second axle slider assembly 116 of the sprayer 10. Turning to FIG. 11, a pair of fixed slider wear pads 166a, 166b, may be associated with each slider receiver. As shown in the figures, the fixed slider wear pads 166a, 166b are mounted to opposite inwardly-facing surfaces of the slider receiver walls. More specifically, a first fixed slider wear pad 166a is mounted to the top wall 80 and a second fixed slider wear pad 166b is mounted to a bottom wall 82. Therefore, in this configuration the fixed slider wear pads 166a, 166b are all horizontally oriented. This would reduce friction between any of the top wall 80 and the bottom wall 82 of the second axle slider leg 120 as it is inserted into the third slider receiver 90. However, the fixed slider wear pads 166 could also be mounted to one or both of the front wall 76 and the rear wall 78, either in combination with the pair of pads 166a, 166b mounted to the top wall 80 and the bottom wall 82 or in isolation. Again, while only the third slider receiver 90 is shown, similar fixed slider pads 166 or pairs of fixed slider pads can be mounted within the first slider receiver 86, the second slider receiver 88, and the fourth slider receiver 92.

Figure 9:
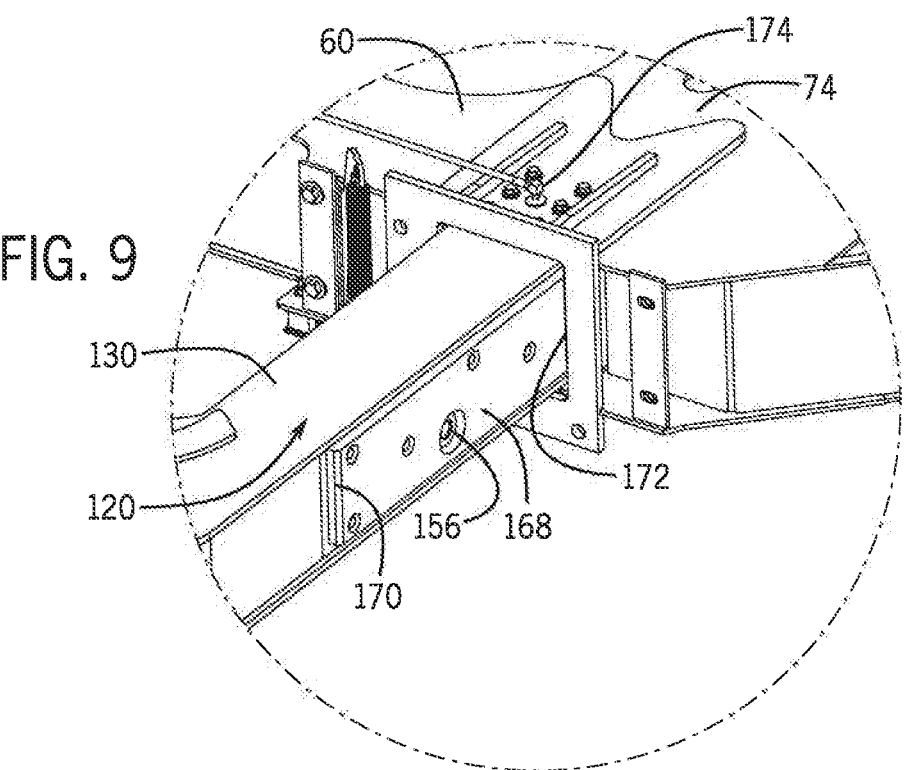
FIG. 9 is a detailed isometric view of the axle slider and a portion of the chassis frame in the second position of FIGS. 4 and 6.

Turning to FIGS. 9 and 10, a single movable wear pad 168 is associated with each axle slider leg 118, 120, 122, 124, with a pair of movable wear pads associated with an entire axle slider 114, 116. More specifically, the movable wear pad 168 is mounted to a rearward-facing wall 128 of the second axle slider leg 120. For instance, the movable wear pad 168 may be mounted in the lip 134 formed by the offset of the front or rear wall 126, 128 and the top and bottom wall 130, 132 described above. The movable wear pad 168 therefor extends beyond the lip 134 to provide a wear pad surface that engages the rear wall 78 of the slider receiver 90. Another movable wear pad (not shown) is mounted to a forward-facing wall 126 of the first axle slider leg 118 associated with the first axle slider assembly 114. In this way, the movable wear pads 168 are vertically oriented. As such, this pair of movable wear pads 168 move in unison with respective first and second axle slider legs 118, 120. As stated above, additional movable wear pads 168 could also be mounted to any of the axle slider legs 118, 120, 122, 124, for instance on the opposite side of the axle slider legs 118, 120, 122, 124. Again, while only the third slider receiver 90 is shown, similar movable slider pads 168 or pairs of movable slider pads can be mounted about the first axle slider leg 118, the third axle slider leg 122, and the fourth axle slider leg 124.

Preferably, the configuration of fixed slider wear pads 166 and movable slider wear pads 168 reduces friction about multiple walls of the axle slider legs 118, 120, 122, 124 and the slider receivers 86, 88, 90, 92. For instance, as shown the slider-to-frame connection 162 protects top and bottom walls 80, 82, 130, 132 by the fixed wear pads 166, and protects front and rear walls 76, 78, 126, 128 using the movable wear pads 168. Additionally, as can be seen in the figures, the movable wear pads 168 may have a surface area greater than the surface area of the fixed wear pad 166. The additional surface area of the movable wear pad 168 accounts for the fact that the axle slider legs 118, 120, 122, 124 will be moving in and out of the slider receivers 86, 88, 90, 92. Therefore, the increased length of the movable wear pad 168 may reflect the travel path and length of the axle slider legs 118, 120, 122, 124 that move into and out of the slider receivers 86, 88, 90, 92. Stated differently, each movable wear pad 168 may have a first end 170 and a second end 172, where the first end 170 is substantially flush with the edge of the frame side rail 60 when the machine 10 is at its narrowest width, as seen for instance in FIG. 3. The second end 172 would be substantially flush with the edge of the frame side rail 60 when the machine 10 is at its widest width, as seen for instance in FIG. 4. In the way, when the sprayer 10 is at any operative width, the movable wear pad will be at least partially engaged between the axle slider legs 118, 120, 122, 124 and the slider receivers 86, 88, 90, 92.

Additionally, where the sprayer 10 features the tread width adjustment feature, each of the slider receivers 86, 88, 90, 92 may include grease fittings configured to allow for insertion of grease into the slider receivers 86, 88, 90, 92 to further reduce the amount of friction between the various components including the slider receivers 86, 88, 90, 92 and the respective axle slider legs 118, 120, 122, 124. For instance, a first grease fitting 174 may be formed in the top wall 80 of the cross members 72, 74 and a second grease fitting (not shown) may be formed in a bottom wall 82 of the cross member 72, 74. Looking to FIG. 9, although the top grease fitting 174 is only shown relative to the third slider receiver 90, similar grease fittings are used with the remaining slider receivers 86, 88, 92. Where the sprayer 10 does not feature the tread width adjustment feature, grease fittings need not be included, but nevertheless the slider to frame connection 162 may facilitate the installation of the first axle slider assembly 114 relative to the first side 50 about the first slider receiver 86 and the third slider receiver 90 and the second axle slider assembly 116 relative to the second side 52 about the second slider receiver 88 and the fourth slider receiver 92.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A high clearance sprayer with adjustable track width comprising:
    a frame comprising a first side, a second side, a first cross member that is substantially hollow extending from the first side to the second side to form a first slider receiver on the first side and a second slider receiver on the second side, and a second cross member that is substantially hollow extending from the first side to the second side to form a third slider receiver on the first side and a fourth slider receiver on the second side;
    a main slider body extending parallel to the first side of the frame;
    a first axle slider assembly having a first axle slider leg extending from a first end of the main slider body and being configured to be telescopically inserted into the first slider receiver and a second slider leg extending from a second end of the main slider body and being configured to be telescopically inserted into the third slider receiver;
    a second axle slider assembly configured to be telescopically inserted into the second slider receiver and the fourth slider receiver;
    a plurality of actuators mounted within the first cross member and the second cross member; and
    a pair of swingarms extending from corresponding front and rear segments of the main slider body, each of the pair of swingarms rotatably supporting a corresponding wheel; wherein:
    the plurality of actuators is secured to the frame and to the first axle slider assembly and the second axle slider assembly; and
    the plurality of actuators telescopically moves the first axle slider assembly and the second axle slider assembly into and out of the first cross member and the second cross member to adjust the width of the track.

2. The high clearance sprayer with adjustable track width of claim 1, wherein the plurality of actuators further comprises:
    a first cylindrical actuator attached to the first axle slider assembly and to the first cross member;
    a second cylindrical actuator attached to the second axle slider assembly and to the first cross member;
    a third cylindrical actuator attached to the first axle slider assembly and to the second cross member; and
    a fourth cylindrical actuator attached to the second axle slider assembly and to the second cross member.

3. The high clearance sprayer with adjustable track width of claim 2, wherein the first actuator and the second actuator run substantially parallel through a central axis extending through the first cross member.

4. The high clearance sprayer with adjustable track width of claim 3, wherein the third actuator and the fourth actuator run substantially parallel through a central axis extending through the second cross member.

5. The high clearance sprayer with adjustable track width of claim 4, wherein a bending moment of each of the actuators relative to the first cross member and the second cross member is minimized.

6. The high clearance sprayer with adjustable track width of claim 2, wherein the first actuator and the second actuator run substantially midway between a top wall and a bottom wall of the first cross member, and
    wherein the first actuator and the second actuator run substantially midway between a front wall and a rear wall of the first cross member.

7. The high clearance sprayer with adjustable track width of claim 2, wherein the third actuator and the fourth actuator run substantially midway between a top wall and a bottom wall of the second cross member, and
    wherein the third actuator and the fourth actuator run substantially midway between a front wall and a rear wall of the second cross member.

8. The high clearance sprayer with adjustable track width of claim 2, wherein the plurality of actuators is substantially isolated from outside of the first cross member and the second cross member.

9. The high clearance sprayer with adjustable track width of claim 2, further comprising a plurality of mounting plates mounted to the first cross member and the second cross member;
    wherein the plurality of actuators is substantially isolated from outside of the first cross member and the second cross member.

10. A high clearance sprayer with adjustable track width comprising:
    a frame comprising a first side, a second side, a first cross member that is substantially hollow extending from the first side to the second side to form a first slider receiver on the first side and a second slider receiver on the second side, and a second cross member that is substantially hollow extending from the first side to the second side to form a third slider receiver on the first side and a fourth slider receiver on the second side;
    a first axle slider assembly configured to be telescopically inserted into the first slider receiver and the third slider receiver;
    a second axle slider assembly configured to be telescopically inserted into the second slider receiver and the fourth slider receiver; and a plurality of actuators mounted within the first cross member and the second cross member;

wherein:

the plurality of actuators is secured to the frame and to the first axle slider assembly and the second axle slider assembly;

the plurality of actuators telescopically moves the first axle slider assembly and the second axle slider assembly into and out of the first cross member and the second cross member to adjust the width of the track;

the plurality of actuators further comprises:
  a first cylindrical actuator attached to the first axle slider assembly and to the first cross member;
  a second cylindrical actuator attached to the second axle slider assembly and to the first cross member;
  a third cylindrical actuator attached to the first axle slider assembly and to the second cross member; and
  a fourth cylindrical actuator attached to the second axle slider assembly and to the second cross member;

the first axle slider assembly further comprises:
  a first axle slider leg configured to be telescopically inserted into the first slider receiver;
  a second axle slider leg configured to be telescopically inserted into the third slider receiver;
  a main slider body that extends parallel to the first side of the frame from the first axle slider leg to the second axle slider leg;
  a pair of swingarms extending from a front and rear segment of the main slider body; and
  a pair of wheels rotatably supported by the pair of swing arms; and the second axle slider assembly further comprises:
  a third axle slider leg configured to be telescopically inserted into the second slider receiver;
  a fourth axle slider leg configured to be telescopically inserted into the fourth slider receiver;
  a main slider body that extends parallel to the second side of the frame from the third axle slider leg to the fourth axle slider leg;
  a pair of swingarms extending from a front and rear segment of the main slider body; and
  a pair of wheels rotatably supported by the pair of swingarms.

11. The high clearance sprayer with adjustable track width of claim 10, wherein the plurality of actuators is mounted to an interior of the first axle slider leg, the second axle slider leg, the third axle slider leg, and the fourth axle slider leg.

12. The high clearance sprayer with adjustable track width of claim 11, wherein each of the plurality of actuators extend or retract the same distance when actuated.

13. A high clearance sprayer with adjustable tread width comprising:

a chassis having a frame with left and right rails at left and right sides of the frame and a pair of frame cross members that extends between the left and right frame side rails and that define slider receivers with longitudinally extending passages;

a left axle slider and a right axle slider at the left and right sides of the frame, each of the left and right axle sliders includes a pair of slider legs extending from a corresponding end of a main slider body and being telescopically housed in the passages of the respective slider receivers;

a first pair of swingarms extending from the main slider body of the left axle slider and a second pair of swingarms extending from the main slider body of the right axle slider, each swingarm of first and second pairs of swingarms rotatably supporting a corresponding wheel; and a plurality of actuators arranged substantially concentrically inside of each of the slider receivers for telescopically moving the respective slider leg within the slider receiver for adjusting tread width, with each frame cross member housing a left actuator for actuating the left axle slider and a right actuator for actuating the right axle slider;

wherein the plurality of actuators telescopically moves the left axle slider assembly and the right axle slider assembly into and out of the first cross member and the second cross member to adjust the width of the track.

14. The high clearance sprayer with adjustable track width of claim 13, wherein the plurality of actuators further comprises:
  a first cylindrical actuator attached to the first axle slider assembly and to the first cross member;
  a second cylindrical actuator attached to the second axle slider assembly and to the first cross member;
  a third cylindrical actuator attached to the first axle slider assembly and to the second cross member; and
  a fourth cylindrical actuator attached to the second axle slider assembly and to the second cross member.

15. The high clearance sprayer with adjustable track width of claim 14, wherein the left actuator comprises the first cylindrical actuator and the third cylindrical actuator; and wherein the right actuator comprises the second cylindrical actuator and the fourth cylindrical actuator.

16. The high clearance sprayer with adjustable track width of claim 13, wherein the plurality of actuators is substantially isolated from outside of the first cross member and the second cross member.

17. The high clearance sprayer with adjustable track width of claim 13, wherein a bending moment of each of the actuators relative to the first cross member and the second cross member is minimized due to concentric location of the plurality of actuators relative to the first cross member and the second cross member.

18. A high clearance sprayer with adjustable tread width comprising:

a chassis having a frame with left and right rails at left and right sides of the frame and a pair of frame cross members that extends between the left and right frame side rails, each of the frame cross members having a central axis extending along the length of the cross member, wherein:

a pair of left slider receivers are defined by left segments of the cross members and each of the left slider receivers has an outer end with an opening that connects to a slider passage that extends longitudinally through the respective slider receiver;

a pair of right slider receivers are defined by right segments of the cross members and each of the right slider receivers has an outer end with an opening that connects to a slider passage that extends longitudinally through the respective slider receiver;

a left axle slider configured to support a pair of left wheels, wherein the left axle slider includes:
  a main slider body that extends parallel to the left frame rail, and
  a pair of slider legs that extend from first and second ends of the main slider body toward the frame, with the slider legs of the left axle slider telescopically housed in the pair of left slider receivers;

a right axle slider configured to support a pair of right wheels, wherein the right axle slider includes:
a main slider body that extends parallel to the right frame rail, and
a pair of slider legs that extend from first and second ends of the main slider body toward the frame, with the slider legs of the right axle slider telescopically housed in the pair of right slider receivers;
a first pair of swingarms extending from the main slider body of the left axle slider and a second pair or swingarms extending from the main slider body of the right axle slider each swingarm of first and second pairs of swingarms rotatably supporting a corresponding wheel;
actuators arranged within the left and right slider receivers for pushing and pulling the slider legs within the respective slider receivers to telescopically adjust the tread width of the high clearance sprayer;
wherein the actuators extend substantially parallel through the central axis of the cross members.

19. The high clearance sprayer with adjustable track width of claim 18, wherein the actuators are substantially isolated from outside of the first cross member and the second cross member.

20. The high clearance sprayer with adjustable track width of claim 18, wherein the actuators are concentrically mounted within the cross members; and
wherein a bending moment of each of the actuators relative to the first cross member and the second cross member is minimized due to concentric location of the actuators relative to the first cross member and the second cross member.

* * * * *